(12) United States Patent
Shen

(10) Patent No.: US 7,376,776 B2
(45) Date of Patent: May 20, 2008

(54) MOTHERBOARD ASSEMBLY

(75) Inventor: Ying-Chih Shen, Ta-Li (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 236 days.

(21) Appl. No.: 11/122,535

(22) Filed: May 5, 2005

(65) Prior Publication Data

US 2006/0252285 A1    Nov. 9, 2006

(51) Int. Cl.
G06F 13/00    (2006.01)

(52) U.S. Cl. .................. 710/301; 710/105; 710/305

(58) Field of Classification Search .............. 710/300, 710/301, 105, 305, 313, 315
See application file for complete search history.

(56) References Cited

U.S. PATENT DOCUMENTS

| | | | |
|---|---|---|---|
| 6,463,493 B1 * | 10/2002 | Hayes et al. ................. | 710/301 |
| 7,219,181 B2 * | 5/2007 | Carty ........................... | 710/301 |
| 2005/0215085 A1 * | 9/2005 | Mehta et al. .................. | 439/65 |
| 2006/0085585 A1 * | 4/2006 | Wu et al. ..................... | 710/306 |
| 2006/0109636 A1 * | 5/2006 | Hood et al. .................. | 361/792 |
| 2006/0158864 A1 * | 7/2006 | Gay ............................. | 361/785 |

OTHER PUBLICATIONS

PCI Express Primer, About: PC Hardware/Reviews, copyright 2007.*
PCI Express 16x Connector Pin Out, http://www.interfacebus.com, undated.*
What is PCI Express? http://www.wisegeek.com, copyright 2007.*

* cited by examiner

Primary Examiner—Khanh Dang
(74) Attorney, Agent, or Firm—Seyfarth Shaw LLP

(57) ABSTRACT

A computer motherboard includes a board body and an expansion unit that is provided on the board body and that defines a hybrid expansion slot that complies with the Peripheral Component Interconnect (PCI) specification and the Peripheral Component Interconnect Express (PCIE) specification.

4 Claims, 3 Drawing Sheets

MOTHERBOARD ASSEMBLY

BACKGROUND OF THE INVENTION

1. Field of the Invention

The invention relates to a motherboard assembly, more particularly to a motherboard assembly with a hybrid expansion slot that complies with the PCI specification and the PCIE specification.

2. Description of the Related Art

A conventional computer motherboard normally includes expansion slots that comply respectively with the Peripheral Component Interconnect (PCI) specification and the Peripheral Component Interconnect Express (PCIE)-associated specification.

In view of the current trend toward miniaturization of electronic devices, there is always a need for reducing the size of the computer motherboard.

SUMMARY OF THE INVENTION

Therefore, the object of the present invention is to provide a computer motherboard that is capable of overcoming the aforesaid drawback associated with the prior art.

Accordingly, there is provided a computer motherboard that comprises: a board body; and an expansion unit provided on the board body and defining a hybrid expansion slot that complies with the Peripheral Component Interconnect (PCI) specification and the Peripheral Component Interconnect Express (PCIE) specification.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
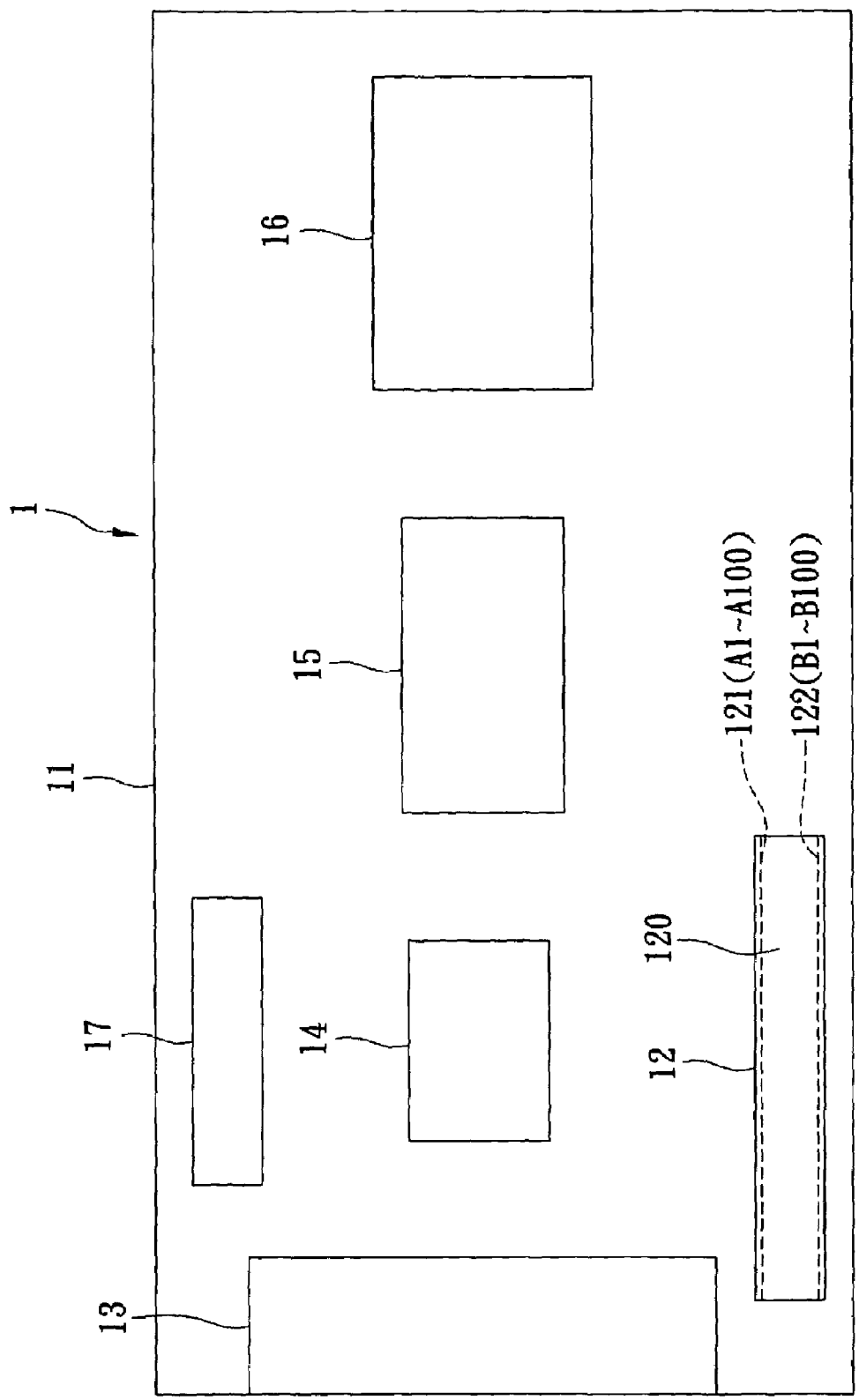
FIG. 1 is a schematic block diagram of the preferred embodiment of a computer motherboard according to the present invention.
Figure 2:
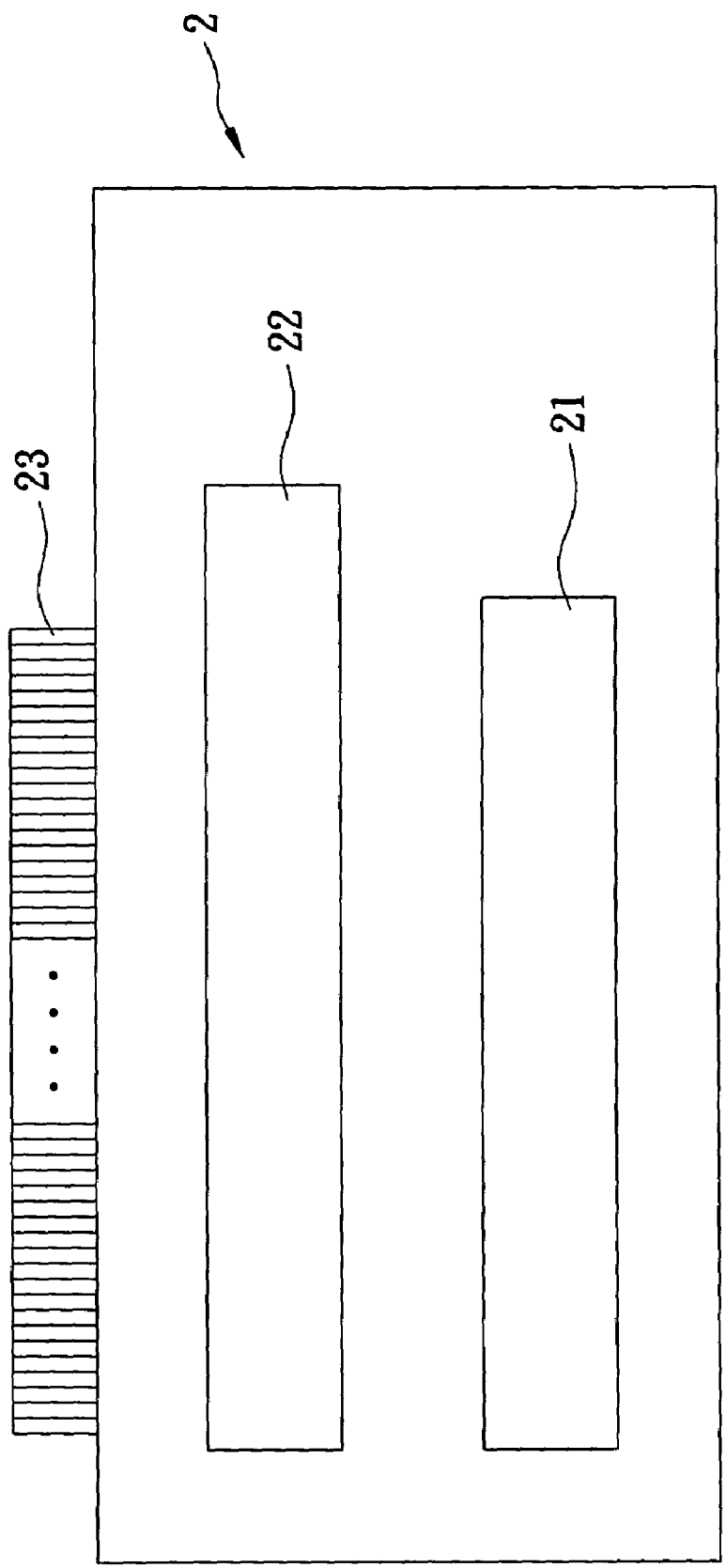
FIG. 2 is a schematic view a riser card used in conjunction with an expansion slot in the computer motherboard of the preferred embodiment.

FIGS. 1 and 2 illustrate the first preferred embodiment of a computer motherboard assembly according to this invention. The computer motherboard assembly includes a computer motherboard 1 and a riser card 2. The computer motherboard 1 includes: a board body 11; an I/O connector 13 provided on the board body 11; an I/O controller hub 14 provided on the board body 11; a graphic memory controller hub 15 provided on the board body 11; a central processing unit 16 provided on the board body 11; a power connector 17 provided on the board body 11; and an expansion unit 12 provided on the board body 11 and defining a hybrid expansion slot 120 that complies with the Peripheral Component Interconnect (PCI) specification and the Peripheral Component Interconnect Express (PCIE) specification.

Since the PCI specification generally requires 124 conductive pins on two sides of a PCI expansion slot, and since the PCIE specification generally requires the total number of 164 conductive pins on two sides of a PCIE expansion slot, the total number of the conductive pins required for a hybrid expansion slot 120 with all of these pins would amount to 288, which would result in a large size for the expansion slot 120. Hence, there is a need to redefine first and second conductive pins 121, 122 of the hybrid expansion slot 120 so as to reduce the total number of the conductive pins while complying with the Peripheral Component Interconnect (PCI) specification and the Peripheral Component Interconnect Express (PCIE) specification.

In this embodiment, the expansion unit 12 has 100 first conductive pins 121 that are marked from A1 to A100 and that are formed on one of two sides of the hybrid expansion slot 120, and 100 second conductive pins 122 that are marked from B1 to B100 and that are formed on the other of the two sides of the hybrid expansion slot 120. The first conductive pins 121 that are marked from A1 to A63 and the second conductive pins 122 that are marked from B1 to B63 correspond to pins of the PCIE×16 specification as noted in Table 1. The first conductive pins 121 that are marked from A64 to A100 and the second conductive pins 122 that are marked from B64 to B100 correspond to pins of the PCI specification as noted in Table 1. In addition, the first conductive pins 121 that are marked from A1 to A18 and the second conductive pins 122 that are marked from B1 to B18 correspond to pins of the PCIE×1 specification as noted in Table 1.

Table 1 illustrates the definitions of the first and second conductive pins 121, 122.

TABLE 1

| Pin | Definition | Pin | Definition | Specification |
|---|---|---|---|---|
| A1 | RSNT1* | B1 | 12 V | PCIE × 16 and PCIE × 1 |
| A2 | 12 V | B2 | 12 V | PCIE × 16 and PCIE × 1 |
| A3 | 12 V | B3 | 12 V | PCIE × 16 and PCIE × 1 |
| A4 | GND | B4 | GND | PCIE × 16 and PCIE × 1 |
| A5 | JTAG2 | B5 | SMCLK | PCIE × 16 and PCIE × 1 |
| A6 | JTAG3 | B6 | SMDAT | PCIE × 16 and PCIE × 1 |
| A7 | JTAG4 | B7 | GND | PCIE × 16 and PCIE × 1 |
| A8 | JTAG5 | B8 | 3V3 | PCIE × 16 and PCIE × 1 |
| A9 | 3.3 V | B9 | JTAG1 | PCIE × 16 and PCIE × 1 |
| A10 | 3.3 V | B10 | 3.3VAUX | PCIE × 16 and PCIE × 1 |
| A11 | PWRGD | B11 | WAKE# | PCIE × 16 and PCIE × 1 |
| A12 | GND | B12 | RSVD | PCIE × 16 and PCIE × 1 |
| A13 | REFCLK+ | B13 | GND | PCIE × 16 and PCIE × 1 |
| A14 | REFCLK− | B14 | HSOP0 | PCIE × 16 and PCIE × 1 |
| A15 | GND | B15 | HSON0 | PCIE × 16 and PCIE × 1 |
| A16 | HSIP0 | B16 | GND | PCIE × 16 and PCIE × 1 |
| A17 | HSIN0 | B17 | PRSNT2* | PCIE × 16 and PCIE × 1 |
| A18 | GND | B18 | GND | PCIE × 16 and PCIE × 1 |
| A19 | HSIP1 | B19 | HSOP1 | PCIE × 16 |
| A20 | HSIN1 | B20 | HSON1 | PCIE × 16 |
| A21 | GND | B21 | GND | PCIE × 16 |

TABLE 1-continued

| Pin | Definition | Pin | Definition | Specification |
|---|---|---|---|---|
| A22 | HSIP2 | B22 | HSOP2 | PCIE × 16 |
| A23 | HSIN2 | B23 | HSON2 | PCIE × 16 |
| A24 | GND | B24 | GND | PCIE × 16 |
| A25 | HSIP3 | B25 | HSOP3 | PCIE × 16 |
| A26 | HSIN3 | B26 | HSON3 | PCIE × 16 |
| A27 | GND | B27 | GND | PCIE × 16 |
| A28 | HSIP4 | B28 | HSOP4 | PCIE × 16 |
| A29 | HSIN4 | B29 | HSON4 | PCIE × 16 |
| A30 | GND | B30 | GND | PCIE × 16 |
| A31 | HSIP5 | B31 | HSOP5 | PCIE × 16 |
| A32 | HSIP5 | B32 | HSON5 | PCIE × 16 |
| A33 | GND | B33 | GND | PCIE × 16 |
| A34 | HSIP6 | B34 | HSOP6 | PCIE × 16 |
| A35 | HSIN6 | B35 | HSON6 | PCIE × 16 |
| A36 | GND | B36 | GND | PCIE × 16 |
| A37 | HSIP7 | B37 | HSON7 | PCIE × 16 |
| A38 | HSIN7 | B38 | HSON7 | PCIE × 16 |
| A39 | GND | B39 | GND | PCIE × 16 |
| A40 | HSIP8 | B40 | HSOP8 | PCIE × 16 |
| A41 | HSIN8 | B41 | HSON8 | PCIE × 16 |
| A42 | GND | B42 | GND | PCIE × 16 |
| A43 | HSIP9 | B43 | HSOP9 | PCIE × 16 |
| A44 | HSIN9 | B44 | HSON9 | PCIE × 16 |
| A45 | GND | B45 | GND | PCIE × 16 |
| A46 | HSIP10 | B46 | HSOP10 | PCIE × 16 |
| A47 | HSIN10 | B47 | HSON10 | PCIE × 16 |
| A48 | GND | B48 | GND | PCIE × 16 |
| A49 | HSIP11 | B49 | HSOP11 | PCIE × 16 |
| A50 | HSIN11 | B50 | HSON11 | PCIE × 16 |
| A51 | GND | B51 | GND | PCIE × 16 |
| A52 | HSIP12 | B52 | HSOP12 | PCIE × 16 |
| A53 | HSIN12 | B53 | HSON12 | PCIE × 16 |
| A54 | GND | B54 | GND | PCIE × 16 |
| A55 | HSIP13 | B55 | HSOP13 | PCIE × 16 |
| A56 | HSIN13 | B56 | HSON13 | PCIE × 16 |
| A57 | GND | B57 | GND | PCIE × 16 |
| A58 | HSIP14 | B58 | HSOP14 | PCIE × 16 |
| A59 | HSIN14 | B59 | HSON14 | PCIE × 16 |
| A60 | GND | B60 | GND | PCIE × 16 |
| A61 | HSIP15 | B61 | HSOP15 | PCIE × 16 |
| A62 | HSIN15 | B62 | HSON15 | PCIE × 16 |
| A63 | GND | B63 | GND | PCIE × 16 |
| A64 | PCI_INTE- | B64 | −12 V | PCI |
| A65 | PCI_INTG- | B65 | PCI_INTF- | PCI |
| A66 | SERIRQ | B66 | PCI_INTH- | PCI |
| A67 | PCIRST | B67 | PCICLK1 | PCI |
| A68 | PCI_GNT- | B68 | GND | PCI |
| A69 | GND | B69 | PCICLK2 | PCI |
| A70 | PCI_PME- | B70 | GND | PCI |
| A71 | AD30 | B71 | PCI_REQ2- | PCI |
| A72 | AD28 | B72 | AD31 | PCI |
| A73 | AD26 | B73 | AD29 | PCI |
| A74 | AD24 | B74 | AD27 | PCI |
| A75 | AD22 | B75 | AD25 | PCI |
| A76 | AD20 | B76 | C_BE-(3) | PCI |
| A77 | AD18 | B77 | AD23 | PCI |
| A78 | AD16 | B78 | AD21 | PCI |
| A79 | 3.3 V | B79 | AD19 | PCI |
| A80 | PCI_FRAME- | B80 | AD17 | PCI |
| A81 | PCI_TRDY- | B81 | C_BE-(2) | PCI |
| A82 | GND | B82 | GND | PCI |
| A83 | PCI_STOP- | B83 | PCI_IRDY- | PCI |
| A84 | 3.3 V | B84 | PCI_DEVSEL | PCI |
| A85 | SMB_CLK_STBY | B85 | GND | PCI |
| A86 | SMB_DAT_STBY | B86 | PCI_LOCK- | PCI |
| A87 | GND | B87 | PCI_PERR- | PCI |
| A88 | PCI_PAR | B88 | PCI_SERR- | PCI |
| A89 | AD15 | B89 | C_BE-(1) | PCI |
| A90 | AD13 | B90 | AD14 | PCI |
| A91 | AD11 | B91 | AD12 | PCI |
| A92 | AD9 | B92 | AD10 | PCI |
| A93 | C_BE-(0) | B93 | AD8 | PCI |
| A94 | AD6 | B94 | AD7 | PCI |
| A95 | AD4 | B95 | AD5 | PCI |
| A96 | AD2 | B96 | AD3 | PCI |
| A97 | AD0 | B97 | AD1 | PCI |
| A98 | PCI_REQ1- | B98 | PCI_GNT1- | PCI |
| A99 | 5 V | B99 | 5 V | PCI |
| A100 | 5 V | B100 | 5 V | PCI |

The riser card 2 is connected removably to the hybrid expansion slot 120, is formed with at least a first expansion slot 21 that complies with the PCI specification and a second expansion slot 22 that complies with the PCIE specification, and includes a goldfinger 23 that is formed with conductive pins on two opposite sides thereof. The conductive pins on the sides of the goldfinger 23 correspond respectively to the first and second conductive pins 121, 122 of the expansion unit 12. When the graphic memory controller hub 15 supports PCIE×1 specification, the PCIE×4 specification, the PCIE×8 specification, the second expansion slot 22 of the riser card 2 and the PCIE interface card (not shown), which is to be inserted into the second expansion slot 22, comply with one of the PCIE×1 specification, the PCIE×4 specification, the PCIE×8 specification, and the PCIE×16 specification. When the graphic memory controller hub 15 supports only the PCIE×1 specification and the PCIE×16 specification, the second expansion slot 22 of said riser card 2 and the PCIE interface card comply with one of the PCIE×1 specification and the PCIE×16 specification. Since the PCI specification supports up to four PCI interface cards, the riser card 2 can be formed with up to four PCI expansion slots 21 for connection with four PCI interface cards.

Figure 3:
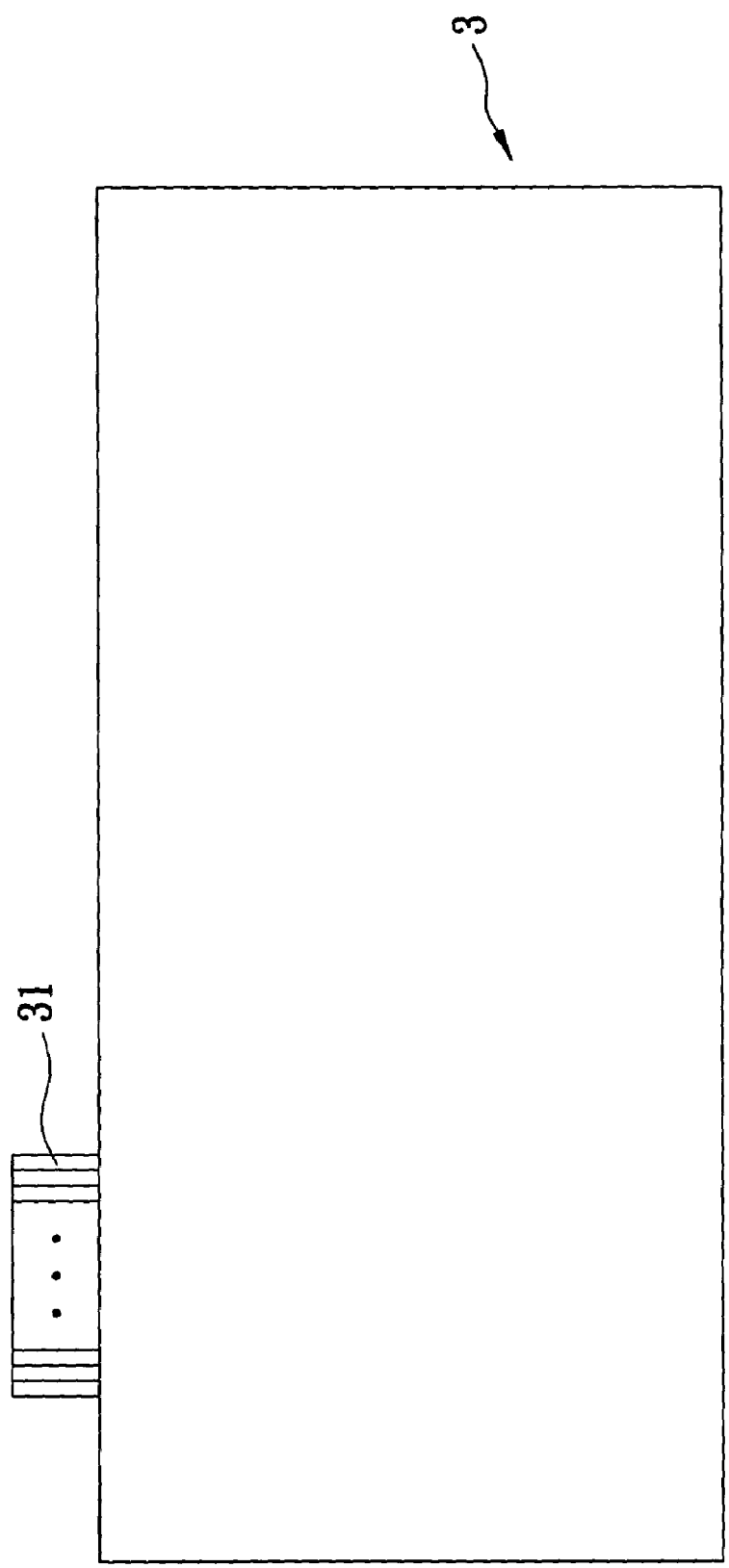
FIG. 3 is a schematic view of an interface card that complies with the PCIE×1 specification and that is used in conjunction with the expansion slot in the computer motherboard of the preferred embodiment.

FIG. 3 illustrates an interface card 3 that complies with the PCIE×1 specification, that includes a goldfinger 31, and that can be directly used in conjunction with the expansion slot 120 on the computer motherboard 1.

Since the computer motherboard 1 of this invention is provided with the hybrid expansion slot 120 that complies with both the PCI specification and the PCIE specification, the size of the computer motherboard 1 can be reduced, thereby permitting miniaturization of the computer that is installed with the computer motherboard 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A motherboard assembly comprising:
a board body;
an expansion unit provided on said board body and defining a hybrid expansion slot that complies with the Peripheral Component Interconnect (PCI) specification and the Peripheral Component Interconnect Express (PCIE) specification; and
a riser card connected removably to said hybrid expansion slot and formed with at least a first expansion slot that complies with the PCI specification and a second expansion slot that complies with the PCIE specification;
wherein said hybrid expansion slot has two opposite sides, said expansion unit having 100 first conductive pins that are marked from A1 to A100 and that are formed on one of said sides of said hybrid expansion slot, and 100 second conductive pins that are marked from B1 to B100 and that are formed on the other of said sides of said hybrid expansion slot, said first conductive pins that are marked from A1 to A63 and said second conductive pins that are marked from B1 to B63 correspond to pins of the PCIE×16 specification, said first conductive pins that are marked from A64 to A100 and said second conductive pins that are marked from B64 to B100 correspond to pins of the PCI specification; and wherein said riser card has conductive pins corresponding to said first conductive pins and said second conductive pins.

2. The motherboard assembly of claim 1, wherein said first conductive pins that are marked from A1 to A18 and said second conductive pins that are marked from B1 to B18 comply with the PCIE×1 specification.

3. The motherboard assembly of claim 1, wherein said second expansion slot of said riser card supports at least one of the PICE×1 specification, the PCIE×4 specification, the PCIE×8 specification, and the PICE×16 specification.

4. The motherboard assembly of claim 3, wherein said second expansion slot of said riser card supports the PCIE×1 specification and the PCIE×16 specification.

* * * * *